US006417313B2

(12) United States Patent
Spyrou

(10) Patent No.: US 6,417,313 B2
(45) Date of Patent: Jul. 9, 2002

(54) LOW MONOMER CONTENT NCO PREPOLYMERS BASED ON 1,4-DIISOCYANATO-2,2,6-TRIMETHYLCYCLOHEXANE, A PROCESS FOR THEIR PREPARATION, AND USE

(75) Inventor: Emmanouil Spyrou, Marl (DE)

(73) Assignee: Degussa AG, Duesseldolf (DE)

(*) Notice: Subject to any disclaimer, the term of this patent is extended or adjusted under 35 U.S.C. 154(b) by 0 days.

(21) Appl. No.: 09/819,662

(22) Filed: Mar. 29, 2001

(30) Foreign Application Priority Data

Mar. 30, 2000 (DE) ........................................ 100 15 891

(51) Int. Cl.7 ........................ C08G 18/75; C08G 18/10; C08G 18/80; C07C 269/02; C07C 271/24

(52) U.S. Cl. ................. 528/59; 252/182.2; 252/182.22; 427/384; 427/385.5; 528/45; 528/60; 528/61; 528/65; 528/67; 528/76; 528/80; 528/85; 560/25; 560/26; 560/115; 560/158; 560/330; 560/336

(58) Field of Search ......................... 252/182.2, 182.22; 427/384, 385.5; 528/45, 59, 60, 61, 65, 67, 76, 80, 85; 560/25, 26, 115, 158, 330, 336

(56) References Cited

U.S. PATENT DOCUMENTS

| | | | | | |
|---|---|---|---|---|---|
| 3,904,796 | A | | 9/1975 | Zorn et al. .................. | 427/390 |
| 4,409,340 | A | | 10/1983 | Stolzenbach et al. ....... | 521/159 |
| 4,528,323 | A | * | 7/1985 | Lorenz et al. .............. | 524/839 |
| 6,242,641 | B1 | * | 6/2001 | Jautelat et al. .............. | 560/330 |

FOREIGN PATENT DOCUMENTS

| | | | |
|---|---|---|---|
| EP | 945427 | * | 9/1999 |

OTHER PUBLICATIONS

Synthesis and properties of main–chain liquid crystalline polyurethane elastomers; J. Appl. Polym. Sci. (1994), 54(2), 207–18.*

* cited by examiner

*Primary Examiner*—Rabon Sergent
(74) *Attorney, Agent, or Firm*—Oblon, Spivak, McClelland, Maier & Neustadt, P.C.

(57) ABSTRACT

Low-monomer, NCO-containing prepolymers based on 1,4-diisocyanato-2,2,6-trimethylcyclohexane, a process for their preparation, and their use.

13 Claims, No Drawings

LOW MONOMER CONTENT NCO PREPOLYMERS BASED ON 1,4-DIISOCYANATO-2,2,6-TRIMETHYLCYCLOHEXANE, A PROCESS FOR THEIR PREPARATION, AND USE

BACKGROUND OF THE INVENTION

1. Field of the Invention

The invention relates to low-monomer containing, NCO-containing prepolymers (hereinafter NCO prepolymers) based on 1,4-diisocyanato-2,2,6-trimethylcyclohexane (TMCDI), to a process for their preparation, and to their use.

2. Discussion of the Background

Aliphatic and cycloaliphatic diisocyanates are widely employed in high-grade light-and weather-stable polyurethane coatings. For many applications, such as for prepolymer formation, it is advantageous if the two isocyanate groups have different reactivities. This so-called selectivity reduces the proportion of unwanted monomers, and the resulting products have lower viscosities and improved technical processability.

Hexamethylene diisocyanate (HDI) exhibits no selectivity whatsoever and so the corresponding NCO prepolymers have a high proportion of unwanted, toxicologically objectionable monomers. Isophorone diisocyanate (IPDI), on the other hand, is selective owing to the different steric environment of the two isocyanate groups, but prepolymerization under identical conditions leads to relatively low monomer contents. In both cases, the monomer content may be lowered by means of a technically complex short-path (flash) distillation.

The object was to find NCO prepolymers having a very low monomer content and being suitable, moreover, for use directly, without a distillation process for the purpose of removing the monomers.

SUMMARY OF THE INVENTION

It has surprisingly been found that 1,4-diisocyanato-2,2,6-trimethylcyclohexane (TMCDI), a readily available cycloaliphatic diisocyanate (J. Appl. Polym. Sci. 1994, 54(2), 207–218; EP 0945427 A1) is particularly suitable for use in NCO prepolymers. Without any complex short-path distillation, the residual monomer content is distinctly lower than in the case of prepolymers based on IPDI.

The invention provides for a low-monomer containing, NCO-containing prepolymer based on 1,4-diisocyanato-2,2,6-trimethylcyclohexane (TMCDI) and polyol, having a residual monomer content of less than 1.0% by weight, obtainable by reacting a diisocyanate component comprising 1,4-diisocyanato-2,2,6-trimethylcyclohexane (TMCDI) and at least one at least difunctional polyol in an NCO/OH ratio of 2–1.5:1 in the presence of at least one catalyst at 20–100° C.

The invention likewise provides a process for preparing NCO-containing prepolymers based on TMCDI and polyols, having a residual monomer content of less than 1.0% by weight, by reacting TMCDI and at least one polyol in an NCO/OH ratio of 2–1.5:1 in the presence of at least one catalyst at 20–100° C.

DETAILED DESCRIPTION OF THE PREFERRED EMBODIMENTS

For the preparation of the low-monomer content, NCO prepolymers of the invention, TMCDI may be introduced as an initial charge, alone or in a mixture with other aliphatic or cycloaliphatic diisocyanates, and an at least difunctional polyol is added. The NCO/OH ratio is between 2:1 and 1.5:1. Generally, the reaction takes place in the presence of a catalyst at 20–100°C. In addition to the polymeric polyols, it is also possible to use chain extenders, such as low molecular weight polyhydric alcohols or amino alcohols, for example. The monomer content of the prepolymer prepared in this way is below 1.0% by weight, usually below 0.5% by weight, and therefore does not require labeling as hazardous to health. Within the context of the present invention, the residual monomer content of the prepolymer describes the content of diisocyanate monomer.

TMCDI may be used alone as the isocyanate component or in combination with other diisocyanates. Examples of diisocyanates suitable for mixing with TMCDI are hexamethylene diisocyanate (HDI), isophorone diisocyanate (IPDI), 4,4'-methylenebis(cyclohexyl isocyanate) (HMDI), 2-methylpentamethylene 1,5-diisocyanate (MPDI), trimethylhexamethylene 1,6-diisocyanate (TMDI), or m-tetramethylxylylene diisocyanate (TMXDI). Preferably TMCDI comprises >25 wt %, more preferably >50 wt %, even more preferably >75 wt % of the isocyanate component.

The polyols used for preparing the prepolymers of the invention are preferably polyesters, polyethers, polyacrylates, polycaprolactones, polycarbonates or polyurethanes or mixtures thereof having a preferred OH functionality of 2–6.

Catalysts that are suitable for the reaction are customary in commerce and are based, generally, on metal compounds or transition metal compounds based on aluminum, tin, zinc, titanium, manganese, bismuth, or zirconium, such as dibutyltin dilaurate, zinc octoate, titanium tetrabutylate or zirconium octoate, for example, or else tertiary amines such as 1,4diazobicylo[2.2.2]octane, for example.

The prepolymers of the invention may also comprise chain extenders, such as low molecular mass polyhydric alcohols or amino alcohols, for example.

Moreover, the NCO-containing prepolymers of the invention may also be blocked using conventional blocking agents such as methyl ethyl ketoxime, ε-caprolactam, diethyl malonate, ethyl acetoacetate, 3,5-dimethylpyrazole, and diisopropyl-amine, for example, and used in heat-curing one-component formulations.

The invention additionally provides a process for preparing NCO-containing prepolymers based on TMCDI and polyols, having a residual monomer content of less than 1.0% by weight, by reacting TMCDI and at least one at least difunctional polyol in an NCO/OH ratio of 2–1.5:1 in the presence of at least one catalyst at 20-100° C.

The invention also provides for the use of the prepolymers in moisture-curing coating systems.

The low-monomer NCO prepolymers of the invention may be cured with moisture at room temperature, either directly or, for the purpose of increasing the reaction rate, with the addition of polyketimines or oxazolidines.

Curing may be accelerated using the catalysts known in the chemistry of isocyanates, examples being tertiary amines, such as 1,4-diazabicyclo[2.2.2]octane, triethylamine, etc., and/or metal salts such as zinc chloride, dibutyltin dilaurate, etc.

Having generally described this invention, a further understanding can be obtained by reference to certain specific examples which are provided herein for purposes of illustration only and are not intended to be limiting unless otherwise specified. The example which follows is intended to illustrate, but not restrict, the invention:

Preparation of an NCO-terminated Prepolymer Based on TMCDI 281 g (1.35 mol) of 1,4-diisocyanato-2,2,6-trimethylcyclohexane and 0.1 g of DBTL were introduced into a reaction vessel and heated to 40° C. At this temperature, 719 g of a polytetramethylene glycol (TERATHANE 1000, OHN: 116, Du Pont) were added dropwise with stirring and under inert gas (NCO/OH=1.8:1). Three hours after dropwise addition, the NCO content was 5.03% (theoretical: 5.04%). The viscosity was 15 Pas and the monomer content was 0.13% by weight (GC).

Comparative Example

Preparation of an NCO-terminated Prepolymer Based on IPDI 294 g (1.32 mol) of isophorone diisocyanate (VESTANAT IPDI, Degussa-Hüls AG) and 0.1 g of DBTL were introduced into a reaction vessel and heated to 40° C. At this temperature, 706 g of a polytetramethylene glycol (TERATHANE 1000, OHN: 116, Du Pont) were added dropwise with stirring and under inert gas (NCO/OH=1.8:1). Three hours after dropwise addition, the NCO content was 4.70% (theoretical: 4.90%). The viscosity was 33 Pas and the monomer content was 2.3% by weight (GC).

This application is based on German patent application 10015891.9 filed in the German Patent Office on Mar. 20, 2000, the entire contents of which are hereby incorporated by reference.

What is claimed is:

1. An NCO-containing prepolymer obtained by reacting a diisocyanate component comprising 1,4-diisocyanato-2,2,6-trimethylcyclohexane and at least one at least difunctional polyol in an NCO/OH ratio of 2–1.5:1 in the presence of at least one catalyst at 20-100° C., wherein said prepolymer has a residual monomer content of less than 1.0% by weight without removing monomers.

2. The prepolymer of claim 1, wherein said residual monomer content is less than 0.5% by weight.

3. The prepolymer of claim 1, wherein said diisocyanate component further comprises a diisocyanate selected from the group consisting of hexamethylene diisocyanate, isophorone diisocyanate, 2-methylpentamethylene 1,5-diisocyanate, trimethylhexamethylene 1,6-diisocyanate, m-tetramethylxylylene diisocyanate, 4,4'-methylenebis (cyclohexyl isocyanate), 2-methylpentamethylene 1,5-diisocyanate and a mixture thereof.

4. The prepolymer of claim 1, wherein said polyol is selected from the group consisting of polyesters, polyethers, polycaprolactones, polyacrylates, polycarbonates, polyurethanes and a mixture thereof.

5. The prepolymer of claim 1, wherein said catalyst is selected from the group consisting of tertiary amines and metal compounds of aluminum, tin, zinc, titanium, manganese, bismuth, or zirconium.

6. The prepolymer of claim 1, wherein said catalyst is selected from the group consisting of dibutyltin dilaurate, zinc octoate, titanium tetrabutylate, zirconium octoate, 1,4-diazabicyclo[2.2.2]octane and a mixture thereof.

7. The prepolymer of claim 1, which further comprises chain extenders coreacted therewith.

8. The prepolymer of claim 1, obtained by further reacting with it a blocking agent.

9. The prepolymer of claim 8, wherein said blocking agent is selected from the group consisting of MEK oxime, ε-caprolactam, diethyl malonate, ethyl acetoacetate, 1,2,4-triazole, 3,5- dimethylpyrazole, diisoproylamine and a mixture thereof.

10. A process for preparing an NCO-containing prepolymer comprising reacting 1,4-diisocyanato-2,2,6-trimethylcyclohexane and at least one at least difunctional polyol in an NCO/OH ratio of 2–1.5:1 in the presence of at least one catalyst at 20–100° C., wherein said prepolymer has a residual monomer content of less than 1.0% by weight without removing monomers.

11. The process of claim 10, wherein said process does not comprise a distillation step of the said NCO-containing prepolymer.

12. A moisture-curing coating system comprising an NCO-containing prepolymer obtained by reacting a diisocyanate component comprising 1,4-diisocyanato-2,2,6-trimethylcyclohexane and at least one at least difunctional polyol in an NCO/OH ratio of 2–1.5:1 in the presence of at least one catalyst at 20–100° C., wherein said prepolymer has a residual monomer content of less than 1.0% by weight without removing monomers.

13. A method of coating comprising applying to a surface an NCO-containing prepolymer obtained by reacting a diisocyanate component comprising 1,4-diisocyanato-2,2,6-trimethylcyclohexane and at least one at least difunctional polyol in an NCO/OH ratio of 2–1.5:1 in the presence of at least one catalyst at 20–100° C., wherein said prepolymer has a residual monomer content of less than 1.0% by weight without removing monomers.

* * * * *

UNITED STATES PATENT AND TRADEMARK OFFICE
CERTIFICATE OF CORRECTION

PATENT NO.    : 6,417,313 B2
DATED         : July 9, 2002
INVENTOR(S)   : Spyrou It is certified that error appears in the above-identified patent and that said Letters Patent is hereby corrected as shown below:

<u>Title page,</u>
Item [73], the Assignee information is incorrect. Item [73] should read:
-- [73]   Assignee:  Degussa AG, Duesseldorf (DE) --

Signed and Sealed this

Thirty-first Day of December, 2002

JAMES E. ROGAN
*Director of the United States Patent and Trademark Office*